United States Patent
Nagai et al.

(10) Patent No.: US 11,902,488 B2
(45) Date of Patent: Feb. 13, 2024

(54) IMAGE PROCESSING APPARATUS, IMAGE PROCESSING METHOD, AND STORAGE MEDIUM FOR IMPROVING THE QUALITY OF PRINTED EDGES

(71) Applicant: CANON KABUSHIKI KAISHA, Tokyo (JP)

(72) Inventors: Hajime Nagai, Kanagawa (JP); Satoshi Wada, Tokyo (JP); Yoshinori Nakajima, Kanagawa (JP); Hidehiko Kanda, Kanagawa (JP); Takeshi Yazawa, Kanagawa (JP); Shingo Nishioka, Kanagawa (JP); Keiji Kuriyama, Saitama (JP); Junichi Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 17/578,248

(22) Filed: Jan. 18, 2022

(65) Prior Publication Data

US 2022/0242138 A1 Aug. 4, 2022

(30) Foreign Application Priority Data

Feb. 1, 2021 (JP) .................. 2021-014555

(51) Int. Cl.
*H04N 1/52* (2006.01)
*H04N 1/60* (2006.01)
*H04N 1/409* (2006.01)

(52) U.S. Cl.
CPC ............. *H04N 1/52* (2013.01); *H04N 1/4092* (2013.01); *H04N 1/6097* (2013.01)

(58) Field of Classification Search
None
See application file for complete search history.

(56) References Cited

U.S. PATENT DOCUMENTS

| 5,465,157 A * | 11/1995 | Seto ......................... G06T 5/20 |
| | | 382/190 |
| 5,822,502 A * | 10/1998 | Li .......................... H04N 1/407 |
| | | 358/1.9 |
| 5,920,682 A * | 7/1999 | Shu ...................... H04N 1/4058 |
| | | 358/1.9 |

(Continued)

FOREIGN PATENT DOCUMENTS

| JP | 4661043 B2 * | 3/2011 |
| JP | 2011131575 A | 7/2011 |

*Primary Examiner* — Scott A Rogers
(74) *Attorney, Agent, or Firm* — Canon U.S.A., Inc. IP Division

(57) ABSTRACT

An image processing apparatus includes an acquisition unit that acquires N-valued image data corresponding to an image including at least one object, and edge data indicating an edge area of the object, an image processing unit that generates M-valued ($N>M≥2$) quantized data where each of a plurality of pixels is associated with one of a value indicating that no dot is to be recorded and a value indicating that a dot is to be recorded, based on the acquired image data, using an image processing parameter, and a changing unit that changes at least one pixel among pixels that indicate the edge area of the object in the edge data and have the value indicating that no dot is to be recorded in the quantized data so that the at least one pixel has the value indicating that the dot is to be recorded.

21 Claims, 14 Drawing Sheets

(56) References Cited

U.S. PATENT DOCUMENTS

| | | | |
|---|---|---|---|
| 7,190,490 B2* | 3/2007 | Cooper | H04N 1/4051 358/3.06 |
| 7,474,443 B2* | 1/2009 | Mizutani | H04N 1/40087 358/3.1 |
| 8,467,089 B2* | 6/2013 | Loce | G06K 15/02 358/1.9 |
| 8,717,630 B2* | 5/2014 | Takahashi | H04N 1/4092 358/3.26 |
| 8,724,167 B2 | 5/2014 | Fujimoto | |
| 9,205,689 B2* | 12/2015 | Ushiyama | G06K 15/107 |
| 11,247,482 B2* | 2/2022 | Nakagawa | H04N 1/605 |
| 2009/0079777 A1* | 3/2009 | Nagamura | B41J 2/205 347/15 |
| 2011/0128560 A1 | 6/2011 | Fujimoto | |
| 2011/0235068 A1* | 9/2011 | Chang | G06K 15/1847 358/1.8 |

\* cited by examiner

FIG.5

| 239 | 47  | 95  | 159 |
|-----|-----|-----|-----|
| 111 | 175 | 223 | 31  |
| 15  | 207 | 191 | 127 |
| 143 | 79  | 63  | 255 |

INPUT IMAGE DATA

BINARY ATTRIBUTE DATA

BINARY ATTRIBUTE
EDGE PORTION DATA

BINARY K DATA

ADDITIONAL DATA

RECORDING DATA

INPUT IMAGE DATA

BINARY ATTRIBUTE DATA

BINARY ATTRIBUTE EDGE PORTION DATA

BINARY K DATA

ADDITIONAL DATA

RECORDING DATA

INPUT IMAGE DATA

BINARY PURE BLACK ATTRIBUTE DATA

BINARY ATTRIBUTE EDGE PORTION DATA

BINARY K DATA

ADDITIONAL DATA

RECORDING DATA

INPUT IMAGE DATA

BINARY ATTRIBUTE DATA

BINARY ATTRIBUTE EDGE PORTION DATA

BINARY K DATA

THINNING TARGET AREA

RECORDING DATA

THINNING MASK DATA (Prior Art)

IMAGE PROCESSING APPARATUS, IMAGE PROCESSING METHOD, AND STORAGE MEDIUM FOR IMPROVING THE QUALITY OF PRINTED EDGES

BACKGROUND

Field of the Disclosure

The present disclosure relates to an image processing apparatus, an image processing method, and a storage medium for recording an image on a recording medium.

Description of the Related Art

Inkjet recording apparatuses can record an image by discharging ink from a recording head to a recording medium. In other words, inkjet recording apparatuses can record an image on a recording medium in a noncontact manner. Thus, inkjet recording apparatuses can support various types of recording media, including plain paper, coated paper, and glossy paper.

The amount of ink that can be applied per unit area varies depending on the pulp material, the paper thickness, or the like even in a case where plain paper is used as the recording medium. Thus, there is a case where the amount of ink to be applied is limited in consideration of the fixed state of the ink on the recording medium on which the image is recorded. On the other hand, if the amount of ink is limited to reduce the number of dots, the quality of recorded characters or lines may deteriorate. Particularly, the quality of recorded small characters or thin lines may deteriorate.

As a method for preventing such deterioration in image quality, Japanese Patent Application Laid-Open No. 2011-131575 discusses a method for recording high quality characters and thin lines by performing edge detection processing on attribute information about an image and converting image data based on the detection result.

According to the technique discussed in Japanese Patent Application Laid-Open No. 2011-131575, for example, the edge detection processing is performed on character attribute information, and recording data corresponding to an non-edge area of the character attribute information is thinned out of quantized image data by using thinning mask data. In other words, high quality characters and thin lines can be recorded by reducing the amount of ink to be applied (the number of recording dots) in the non-edge area while maintaining the amount of ink in the edge area.

SUMMARY

Some embodiments in the present disclosure are directed to providing an image processing apparatus capable of improving the quality of objects, such as characters and line drawings, by adding dots to an edge area without deterioration in image quality.

According to an aspect of some embodiments, an image processing apparatus includes an acquisition unit configured to acquire N-valued image data corresponding to an image including at least one object, and edge data indicating an edge area of the at least one object, an image processing unit configured to generate M-valued (N>M≥2) quantized data where each of a plurality of pixels is associated with one of a value indicating that no dot is to be recorded and a value indicating that a dot is to be recorded, based on the image data acquired by the acquisition unit, using an image processing parameter, and a changing unit configured to change at least one pixel among pixels that indicate the edge area of the at least one object in the edge data and have the value indicating that no dot is to be recorded in the quantized data so that the at least one pixel has the value indicating that the dot is to be recorded.

Further features of various embodiments will become apparent from the following description of exemplary embodiments with reference to the attached drawings.

BRIEF DESCRIPTION OF THE DRAWINGS

FIG. 5 is a diagram illustrating a dither pattern according to the first exemplary embodiment.

DESCRIPTION OF THE EMBODIMENTS

Exemplary embodiments will be described below with reference to the drawings.

Figure 1:
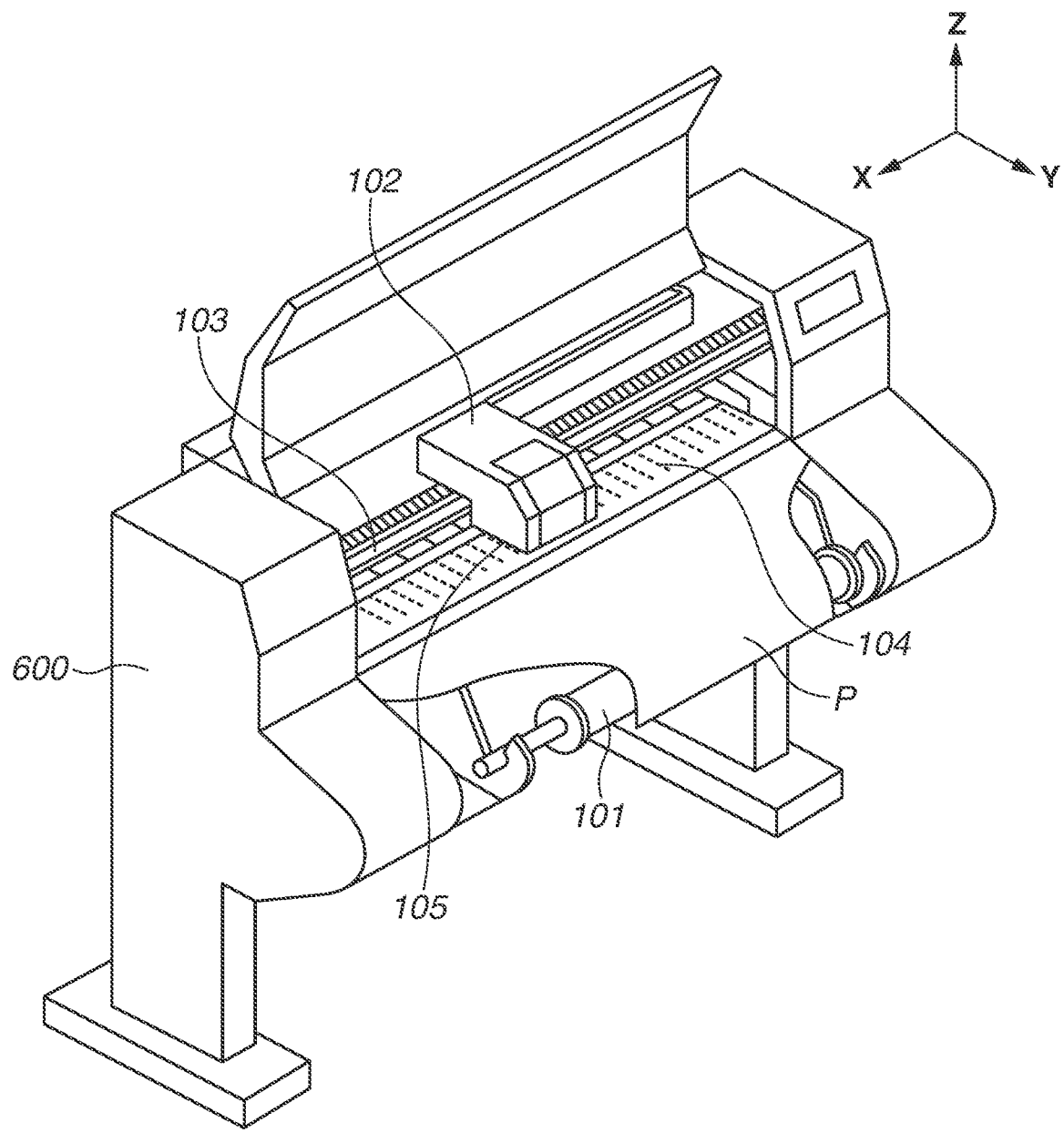
FIG. 1 is a schematic diagram illustrating an inkjet recording apparatus according to a first exemplary embodiment.

FIG. 1 illustrates an external appearance of a recording apparatus 600 according to a first exemplary embodiment. The recording apparatus 600 according to the present exemplary embodiment is a serial scan type inkjet recording apparatus. The recording apparatus 600 scans a recording head 105 in an X direction (a scanning direction) orthogonal to a Y direction (a conveyance direction) of a recording medium P. While the recording head 105 is scanned, ink is discharged from discharge ports of the recording head 105 to record an image on the recording medium P.

A configuration and a recording operation of the recording apparatus 600 will be described briefly with reference to FIG. 1. A conveyance motor 401 (refer to FIG. 3) initially drives a conveyance roller via a gear, whereby a spool 101 holding the recording medium P conveys the recording medium P in the Y direction. At a timing when the recording medium P is conveyed to a predetermined conveyance position, a carriage motor 402 (refer to FIG. 3) causes a carriage unit 102 to perform reciprocating scanning while moving forward in the +X direction and backward in the −X direction along a guide shaft 103 extending in the X direction. The recording head 105 is mounted on the carriage unit 102.

Figure 2:
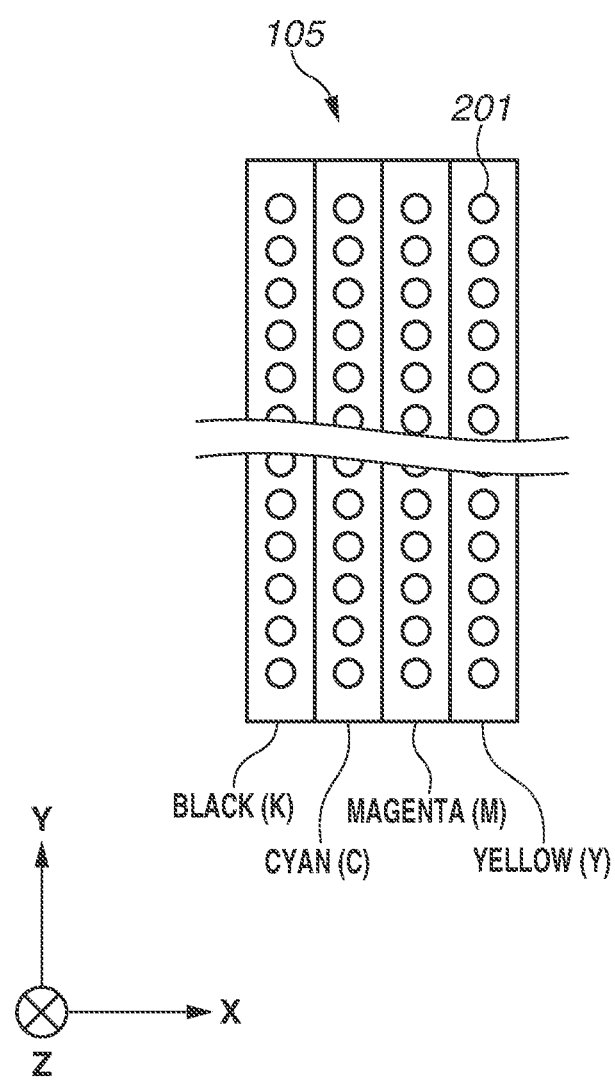
FIG. 2 is a schematic diagram illustrating a discharge port surface of a recording head according to the first exemplary embodiment.

FIG. 2 illustrates a discharge port surface of the recording head 105 viewed from a Z direction. A plurality of discharge ports 201 is arranged on the discharge port surface along the Y direction. The recording head 105 according to the present exemplary embodiment includes a black (K) discharge port array for discharging K ink, a cyan (C) discharge port array for discharging C ink, a magenta (M) discharge port array for discharging M ink, and a yellow (Y) discharge port array for discharging Y ink.

Returning to FIG. 1, the plurality of discharge ports 201 performs an ink discharge operation at a timing based on a position signal obtained by an encoder during the reciprocating scanning in the +X and −X directions. The ink discharge operation enables an image to be recorded on the recording medium P in an area of a fixed band width corresponding to the arranged area of the discharge ports 201 in the Y direction. A driving force can be transmitted from the carriage motor 402 to the carriage unit 102 by using a carriage belt. Instead of the carriage belt, other driving methods may also be used. Examples thereof include a combination of a lead screw that extends in the X direction and is driven to rotate by the carriage motor 402 and an engagement unit that is provided on the carriage unit 102 and engaged with the thread of the lead screw.

The fed recording medium P is sandwiched between the conveyance roller and a pinch roller and conveyed to a recording position on a platen 104, i.e., the scanning area of the recording head 105 mounted on the carriage unit 102. In a standby state where no recording operation is performed, the discharge port surface of the recording head 105 is normally capped with a cap member. Thus, before the recording operation, the cap member is released to make the recording head 105 and the carriage unit 102 ready for scanning. The carriage motor 402 then scans the carriage unit 102 to perform the recording operation in response to accumulation of recording data for one recording scan in a buffer.

Figure 3:
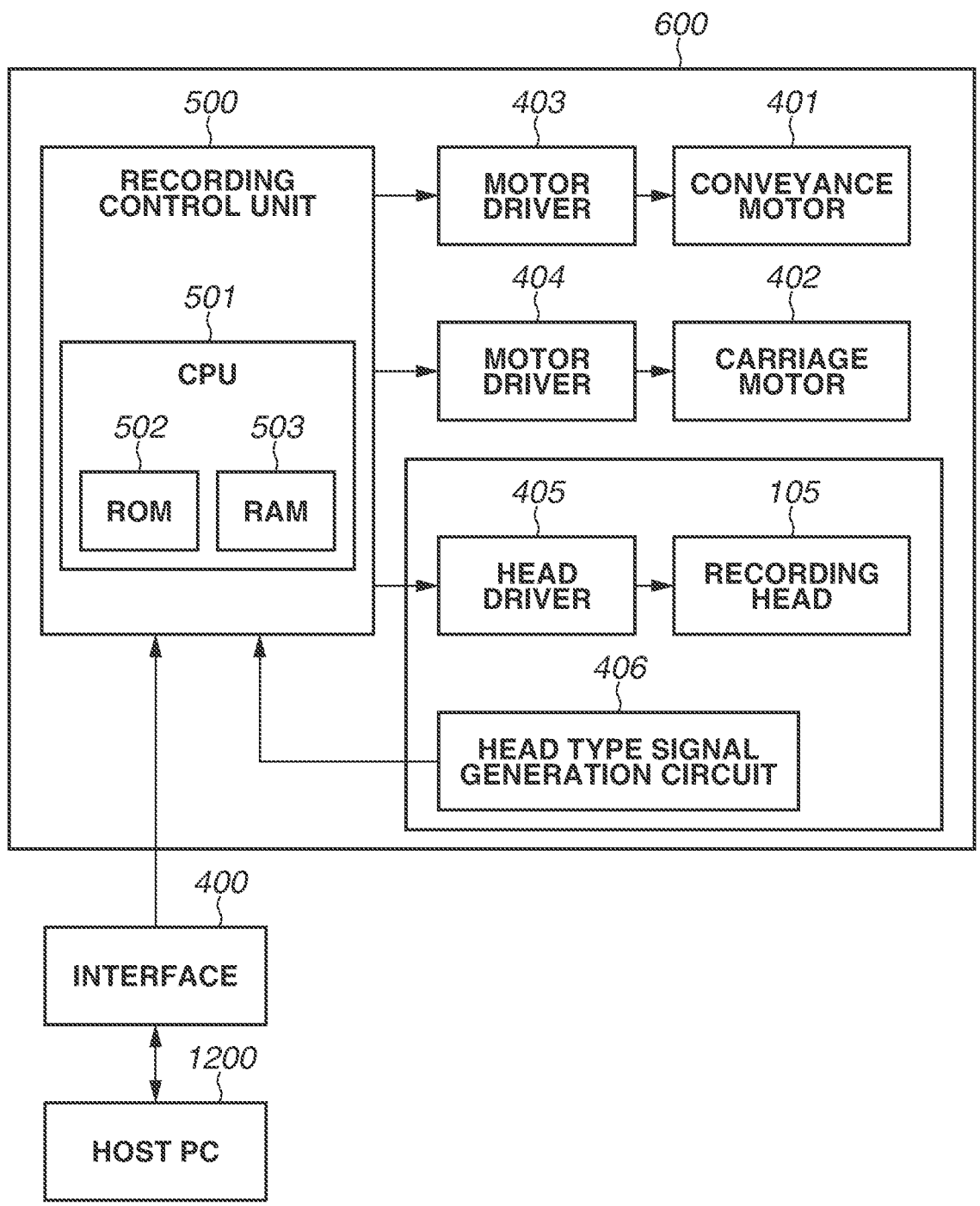
FIG. 3 is a block diagram illustrating a schematic configuration of a recording control system circuit of the inkjet recording apparatus according to the first exemplary embodiment.

FIG. 3 is a block diagram illustrating a schematic configuration of a recording control system circuit of the recording apparatus 600 illustrated in FIG. 1. The recording apparatus 600 is connected to an external data supply apparatus, such as a host computer (hereinafter referred to as a host personal computer (PC)) 1200, via an interface 400. Various types of data and recording-related control signals transmitted from the data supply apparatus are input to a recording control unit 500 of the recording apparatus 600.

The recording control unit 500 includes a central processing unit (CPU) 501, a read-only memory (ROM) 502, and a random access memory (RAM) 503. The ROM 502 stores programs to be executed by the CPU 501. The RAM 503 is used as a working memory of the CPU 501. The CPU 501 reads the programs stored in the ROM 502 and performs various types of image processing on image data.

The various types of image processing to be described below may be performed by either the host PC 1200 or the recording apparatus 600. The host PC 1200 may be configured to process part or all of image data and input the processed data to the recording control unit 500 via the interface 400.

The recording control unit 500 controls motor drivers 403 and 404 and a head driver 405 to be described below, based on control signals input via the interface 400. The recording control unit 500 processes input image data and also processes a signal input from a head type signal generation circuit 406 to be described below. The conveyance motor 401 rotates the conveyance roller to convey the recording medium P. The carriage motor 402 causes the carriage unit 102, on which the recording head 105 is mounted, to reciprocate. The motor driver 403 drives the conveyance motor 401. The motor driver 404 drives the carriage motor 402. The head driver 405 drives the recording head 105. A plurality of the head drivers 405 is provided based on the number of the recording heads 105. The head type signal generation circuit 406 supplies, to the recording control unit 500, a signal indicating the type and number of the recording heads 105 mounted on the carriage unit 102.

Next, edge processing according to the present exemplary embodiment will be described. In the present exemplary embodiment, edge areas of objects determined to be characters or lines are detected based on attribute data indicating a character attribute and a line attribute. Recording data is added to image data in the detected edge areas by data processing using additional mask data. More specifically, among pixels detected as the edge areas, values of pixels where dots are not to be recorded are changed to a value indicating that dots are to be recorded. This can improve the quality of the characters or lines. Particularly, even in a case where the amount of ink to be applied per unit area (the number of recording dots) is limited depending on properties based on the type of the recording medium P, the quality of characters and line drawings can be improved without causing an image defect, such as a texture artifact. Details of the processing will be described below.

Figure 4:
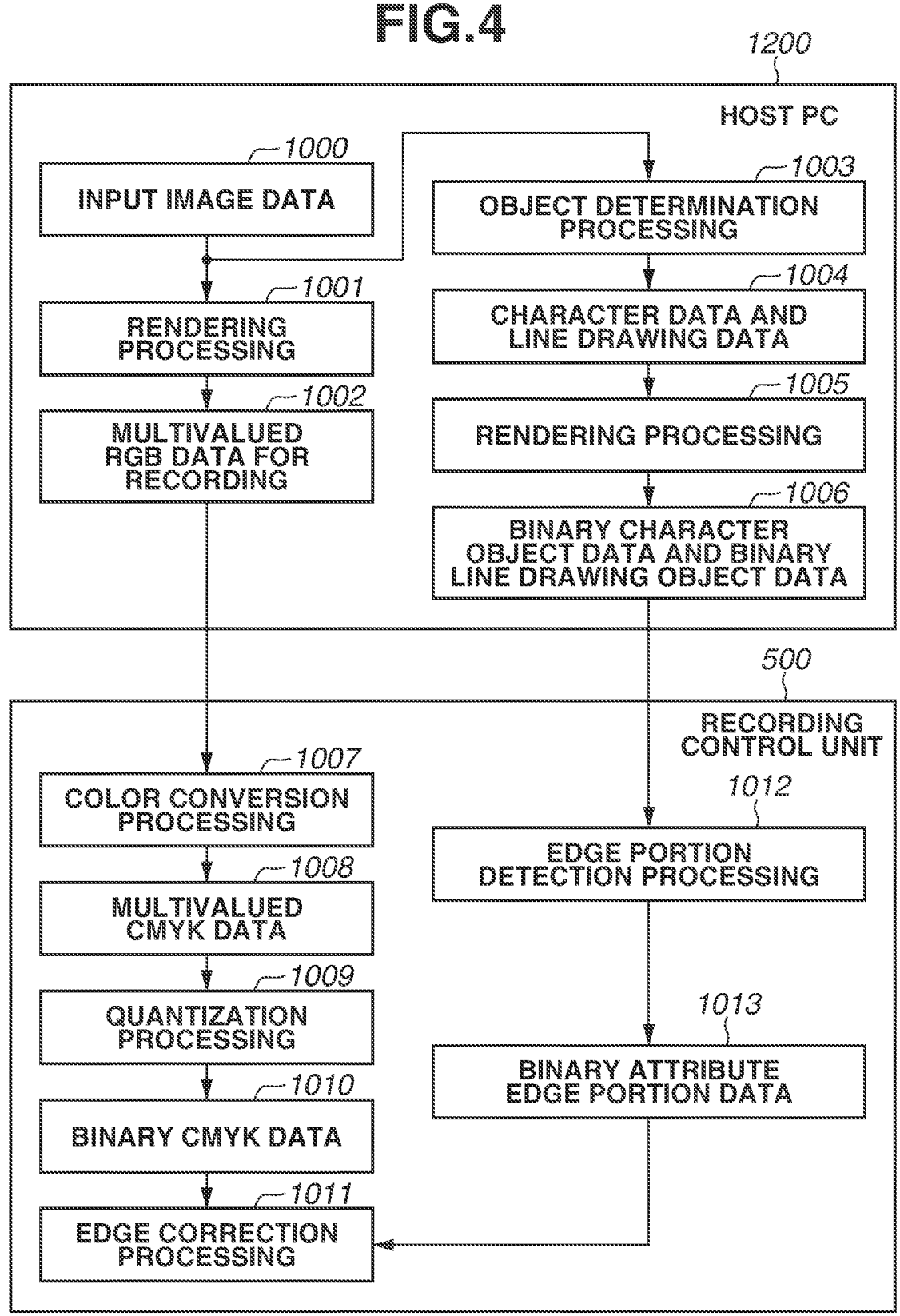
FIG. 4 is a functional block diagram schematically illustrating an image data processing configuration according to the first exemplary embodiment.

FIG. 4 is a functional block diagram schematically illustrating an image data processing configuration of an image processing system including the recording apparatus 600 and the host PC 1200. The recording control unit 500 processes the data transmitted from the host PC 1200, on which a printer driver is installed, via the interface 400 of FIG. 3.

The host PC 1200 receives input image data 1000 and recording condition information from an application. The recording condition information includes type information indicating the type of the recording medium P, and quality information indicating recording quality. The input image data 1000 includes attribute information indicating the types of image components. The host PC 1200 initially performs rendering processing 1001 at a resolution of 1200 dots per inch (dpi) based on the received input image data 1000, whereby multivalued red-green-blue (RGB) data for recording 1002 is generated. The multivalued RGB data for recording 1002 according to the present exemplary embodiment is 256-valued data with 256 levels of gradation.

Meanwhile, based on the input image data 1000, the host PC 1200 performs object determination processing 1003 for determining the plurality of types of image components included in the input image data 1000. At this time, the host PC 1200 determines character objects and line drawing objects (character data and line drawing data 1004). The host PC 1200 performs rendering processing 1005 on the determined character data and line drawing data 1004 at the same resolution as that of the rendering processing 1001. In the rendering processing 1005, binary character object data and binary line drawing object data 1006 with a resolution of 1200 dpi are generated. The multivalued RGB data for recording 1002 with 256 levels of gradation and the binary character object data and binary line drawing object data 1006 generated as described above are transferred to the recording control unit 500.

The recording control unit 500 performs color conversion processing 1007 for converting the multivalued RGB data for recording 1002 into multivalued CMYK data 1008 based on a color conversion table. The multivalued CMYK data 1008 generated at this time is 256-valued data with 256 levels of gradation. In the color conversion table, information about each color of the multivalued RGB data for recording 1002 is associated with the ink amount of C, M, Y, and K inks based on a maximum recording duty at which an image can be recorded on the recording medium P.

Next, the recording control unit 500 performs quantization processing 1009 for quantizing the multivalued CMYK data 1008. In the present exemplary embodiment, the recording control unit 500 generates binary quantized data by performing dither-based quantization processing using a threshold matrix.

FIG. 5 illustrates a dither pattern (a quantization pattern) used in the quantization processing 1009 according to the present exemplary embodiment. The dither pattern is a threshold matrix of 4×4 pixels that defines thresholds for determining recording or non-recording for each of a plurality of pixel areas with 1200 dpi×1200 dpi per pixel. In the quantization processing 1009, the multivalued CMYK data 1008 (the 256-valued CMYK data) is compared with the 16-level gradation thresholds to generate binary quantized data for each ink color. The recording control unit 500 compares the threshold in each of the pixels in FIG. 5 with the multivalued CMYK data 1008 (the 256-valued CMYK data). If the input value is greater than or equal to the threshold, a value indicating recording is determined as the pixel value. If the input value is less than the threshold, a value indicating non-recording is determined as the pixel value. At pixel positions where the thresholds are high, high gradation (dark part) image data with high input values is recorded. At pixel positions where the thresholds are low, not only high gradation (dark part) image data with high input values but also low gradation (light part) image data with low input values are recorded. The quantization processing 1009 is performed on the entire multivalued CMYK data 1008 by using the dither pattern of 4×4 pixels repeatedly in the Y and X directions, whereby binary quantized data (binary CMYK data 1010) is generated.

The quantization processing 1009 is not limited to binary quantized values, and may generate quantized data with a smaller number of gradation levels than that of the unquantized image data. In other words, in the present exemplary embodiment, quantized data with gradation levels less than 256 is generated. While in the present exemplary embodiment, the dithering technique is used, other techniques may be used. For example, multivalued data quantized by the dithering technique may be further quantized into binary quantized data by using dot arrangement patterns associated with respective quantization levels.

Meanwhile, binary attribute data obtained by ORing the binary character object data and binary line drawing object data 1006 is transferred to the recording control unit 500. Based on the binary attribute data, the recording control unit 500 performs edge portion detection processing 1012, so that binary attribute edge portion data 1013 is generated.

Finally, the recording control unit 500 performs edge correction processing 1011 (described below) based on the binary CMYK data 1010 and the binary attribute edge portion data 1013.

Image processing parameters, such as the color conversion table used in the color conversion processing 1007 and the dither pattern used in the quantization processing 1009, are optimally set based on the information indicating the type of the recording medium P and the information indicating the recording quality. Details thereof will be described below.

In the present exemplary embodiment, the attribute data (the object data) indicating the attributes of objects included in an image is generated by the printer driver on the host PC 1200. A digital document generated by an application or the like is expressed using a command system, such as a page description language (PDL). The commands include objects that are roughly classified into the following three types. One is a character object. The second is a graphic object, such as vector data on a shape or a free curve. The third is a bitmap object, such as image data or data obtained by reading a picture or a printed material using a scanner. Line drawing object data in the following description is a type of graphic object. These objects are included in the input image data 1000 illustrated in FIG. 4.

In the case of a character, the object data, which is attribute information, includes data such, as a character code for identifying the character, a font defining the shape of the character, size information indicating the size of the character, and color information indicating the color of the character. The object data cannot be interpreted directly by the recording apparatus 600. Thus, the printer driver controls an interface with the recording apparatus 600 and converts the object data into two-dimensional bitmap data that is interpretable appropriately, i.e., the multivalued RGB data for recording 1002. At the same time, the printer driver outputs the character data and line drawing data 1004 as well. The character data and line drawing data 1004 are two-dimensional information in which each pixel has attribute information. The printer driver generates the multivalued RGB data for recording 1002 and the character data and line drawing data 1004 so as to be associated with each other on a pixel-by-pixel basis.

In the present exemplary embodiment, the character object data and the line drawing object data are handled without distinction. The data transferred from the host PC 1200 to the recording control unit 500 includes 24 (8×3) bit information as the multivalued RGB data for recording 1002, and 1 bit information as the binary attribute data obtained by ORing the binary character object data and binary line drawing object data 1006. In other words, the amount of information per pixel is 25 (24+1) bits. While in the present exemplary embodiment, the multivalued RGB data for recording 1002 is described to be 24 (8×3) bit data, the multivalued RGB data for recording 1002 may be 30 (10×3) bit data, 36 (12×3) bit data, or 48 (16×3) bit data. Multivalued CMYK data for recording may be input instead of the multivalued RGB data for recording 1002. If multivalued CMYK data for recording is input, the color conversion processing 1007 may or may not be performed.

Figure 6:
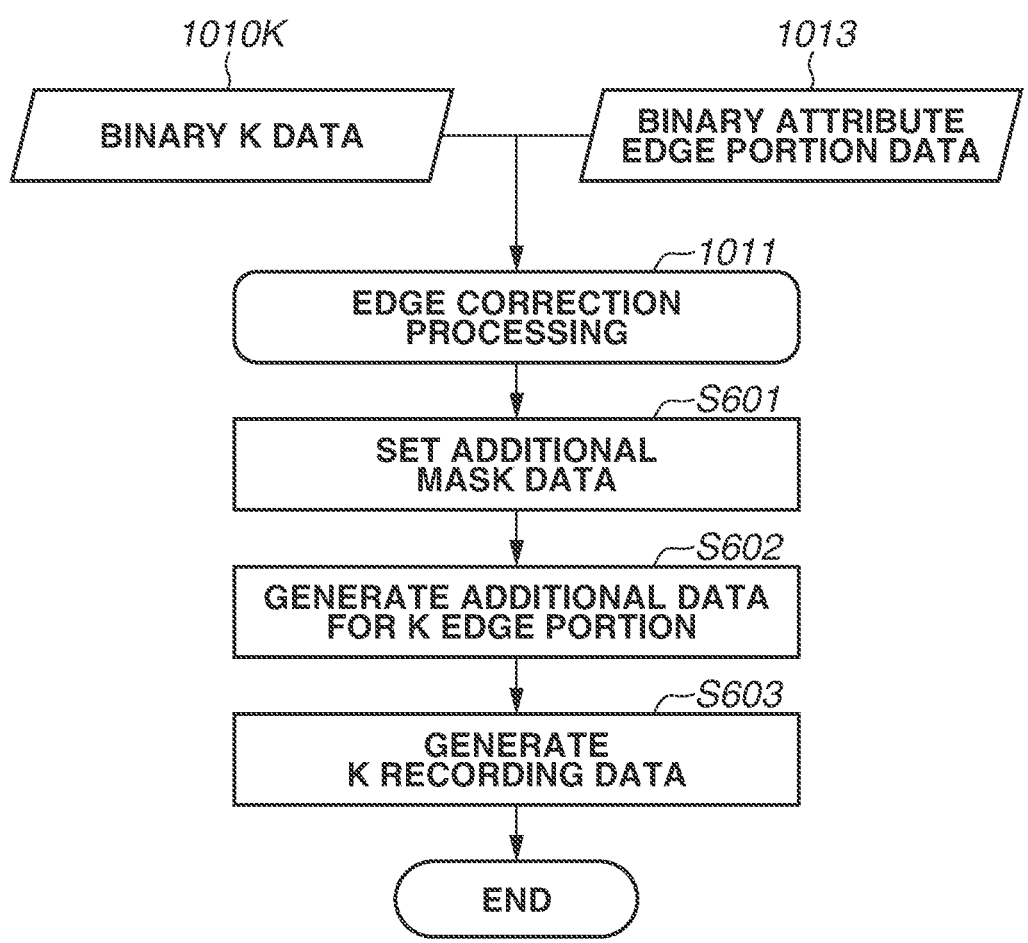
FIG. 6 is a flowchart illustrating edge correction processing according to the first exemplary embodiment.

FIG. 6 is a flowchart illustrating the edge correction processing 1011 in FIG. 4. The edge correction processing 1011 is started with binary K data 1010K (included in the binary CMYK data 1010) and the binary attribute edge portion data 1013 as input data. While in the present exemplary embodiment, K (black ink) data is a processing target, this is not restrictive and the edge correction processing 1011 may also be applied to CMY data.

Figure 7:
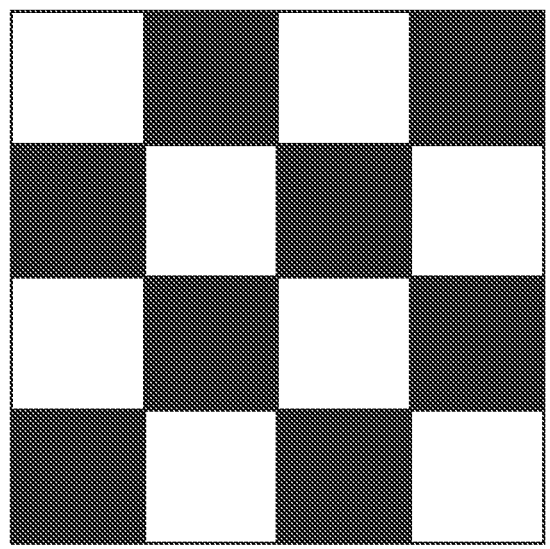
FIG. 7 is a diagram illustrating additional mask data according to the first exemplary embodiment.

In S601, the recording control unit 500 sets 50%-duty additional mask data illustrated in FIG. 7 (described below) as mask data for adding image data to a K edge portion. In S602, the recording control unit 500 generates additional data for the K edge portion by using the additional mask data. More specifically, the recording control unit 500 generates the additional data for the K edge portion by ANDing the binary attribute edge portion data 1013 and the additional mask data.

In S603, the recording control unit 500 generates K recording data by ORing the binary K data 1010K and the additional data for the K edge portion generated in S602, and the processing ends.

Figure 8A:
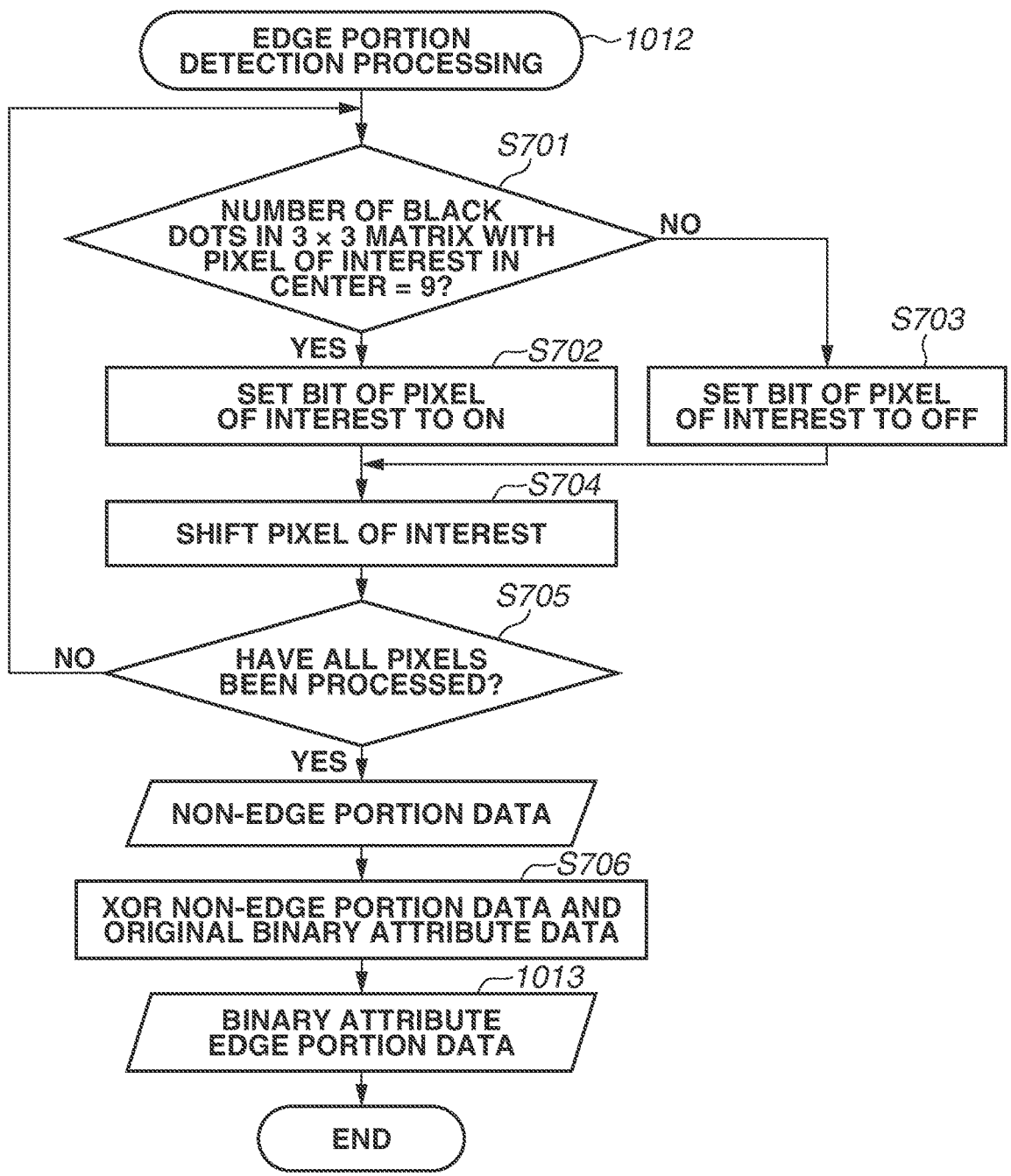
FIGS. 8A and 8B are diagrams illustrating edge portion detection processing according to the first exemplary embodiment.
Figure 8B:
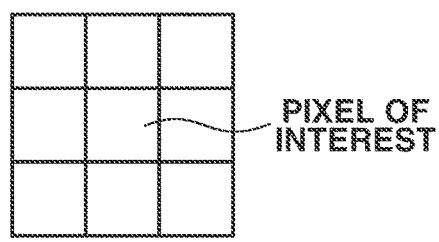

FIG. 8A is a flowchart illustrating the edge portion detection processing 1012 in FIG. 4. FIG. 8B is a schematic diagram illustrating a relationship between a matrix that can be used in the edge portion detection processing 1012 and a pixel of interest. The edge portion detection processing 1012 is performed on the binary attribute data obtained by ORing the input binary character object data and binary line drawing object data 1006. In S701, the recording control unit 500 determines whether a value of the pixel of interest indicates a black dot and the number of black dots in the 3×3 matrix with the pixel of interest in the center is nine. Whether the pixel of interest indicates a black dot is determined based on whether a K value of the pixel of interest is "1" ("dot ON"). If the number of black dots in the matrix is nine (YES in S701), the processing proceeds to S702. In S702, the recording control unit 500 sets the bit of the pixel of interest to ON (black). If the number of black dots is not nine (NO in S701), the processing proceeds to S703. In S703, the recording control unit 500 sets the bit of the pixel of interest to OFF (white). In S704, the recording control unit 500 shifts the pixel of interest in the binary attribute data by one pixel in the scanning direction. Such a determination operation is repeated until the detection processing is completed for all the pixels in the binary attribute data. In S705, the recording control unit 500 determines whether the detection processing has been completed. If the detection processing is determined to have been completed (YES in S705), the processing proceeds to S706 to complete the detection of non-edge portion data in the binary attribute data. If the detection processing is determined to not have been completed (NO in S705), the processing returns to S701 to repeat the foregoing processing.

In S706, the recording control unit 500 XORs the detected non-edge portion data in the binary attribute data and the input original binary attribute data, so that the binary attribute edge portion data 1013 is generated. In the present exemplary embodiment, a one-pixel-wide outline of an object is detected as an edge area (an edge portion), and an internal area of the at least one object other than the one-pixel-wide outline is detected as a non-edge area (a non-edge portion). The number of pixels corresponding to the width of the edge portion is not limited to one. The outline with a width of a plurality of pixels may be detected as the edge portion. In some embodiments, it is desirable to detect the edge portion with a width of one to four pixels.

The data generation processing described so far will be described with reference to FIGS. 9A to 9F. The following description deals with a case where the maximum recording duty of a recording area, including a solid image portion, on the recording medium P is limited to 25% or less as a setting for accommodating plain paper with a low ink absorption property and low fixability. The recording duty refers to a recording ratio indicating the amount of ink to be applied per unit area. In the present exemplary embodiment, a case where one dot is recorded on a pixel with 1200 dpi×1200 dpi will be defined as a recording duty of 100%.

Figure 9A:
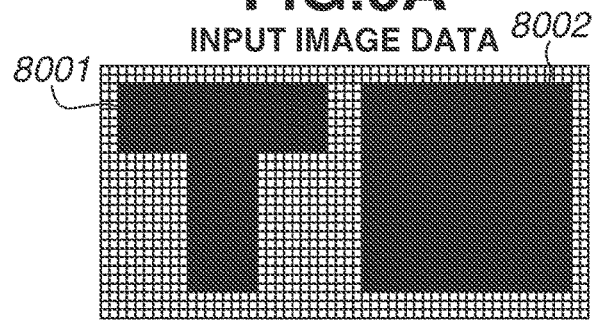
FIGS. 9A to 9F are diagrams illustrating data generation processing according to the first exemplary embodiment.
Figure 9B:
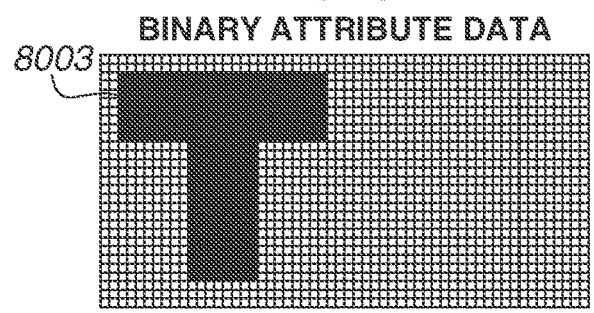

FIG. 9A illustrates the input image data 1000, which includes a black character 8001 and a solid portion 8002 of (R, G, B)=(0, 0, 0). FIG. 9B corresponds to the binary attribute data obtained by ORing the binary character object data and binary line drawing object data 1006 of FIG. 4.

In FIG. 9B, character attribute data 8003 corresponds to the black character 8001, and there is no attribute data corresponding to the solid portion 8002.

Figure 9D:
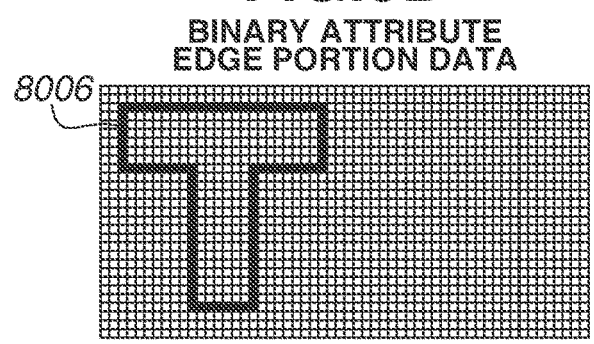
Figure 9C:
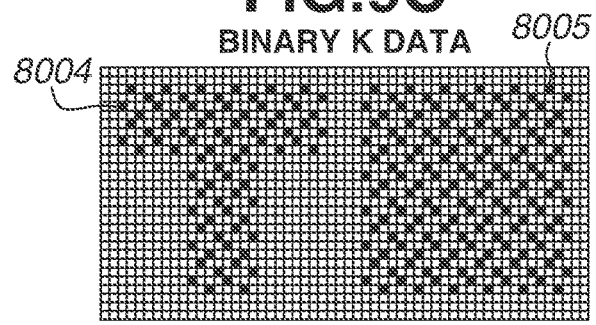

FIG. 9C illustrates the binary K data 1010K included in the binary CMYK data 1010 of FIG. 4. Image processing parameters corresponding to the maximum recording duty (25%) are set in the color conversion processing 1007 and the quantization processing 1009, whereby the binary K data 1010K having a 25% duty including a black character portion 8004 and a solid portion 8005 is generated.

FIG. 9D illustrates the binary attribute edge portion data 1013 detected in the edge portion detection processing 1012 of FIG. 4. Character attribute edge portion data 8006 in FIG. 9D is obtained by detecting the one-pixel-wide outline of the edge portion from the character attribute data 8003.

Figure 9E:
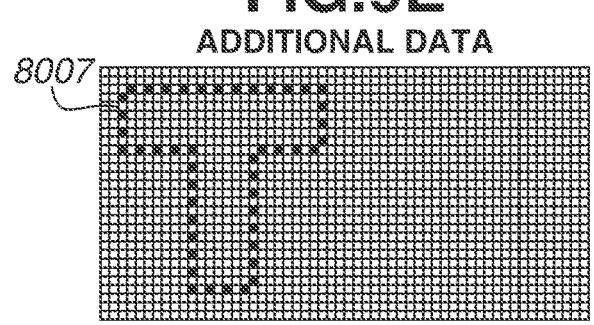

FIG. 9E illustrates additional data 8007 as the additional data generated in S602 of FIG. 6. FIG. 7 illustrates the 50%-duty additional mask data. The 50%-duty additional mask data includes 4×4 pixels with 1200 dpi per pixel, where black pixels (1) represent pixels where data is to be added and white pixels (0) represent pixels where no data is to be added. The character attribute edge portion data 8006 and the additional mask data are ANDed to generate the additional data 8007. At this time, the additional mask data is repeatedly used in the X direction (the scanning direction) and the Y direction (the conveyance direction).

Figure 9F:
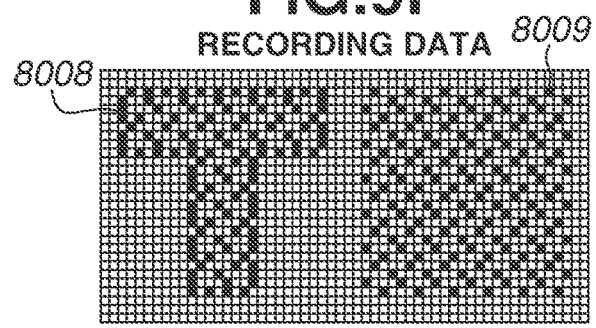

FIG. 9F illustrates the recording data generated in S603 of FIG. 6. The recording data is generated by ORing the binary K data of FIG. 9C and the additional data 8007 of FIG. 9E. It can be seen that some of the white pixels (0) indicating no dot recording in the binary K data of FIG. 9C are changed to black pixels (1) indicating dot recording and the pixel values thereof are changed. As a result, with the additional data 8007, the edge portion of a black character portion 8008 of the recording data has a recording duty of 50% or more, so that the black character can be output with a sharp outline. While the recording duty of the edge portion exceeds the limit value of 25%, the fixability of the recording dots is not much affected since the edge portion is a local area with one pixel width.

On the other hand, since the quantized data is maintained in the non-edge portion of the black character portion 8008 and a solid portion 8009, the image can be output without image quality deterioration, such as a texture artifact.

Figure 14A:
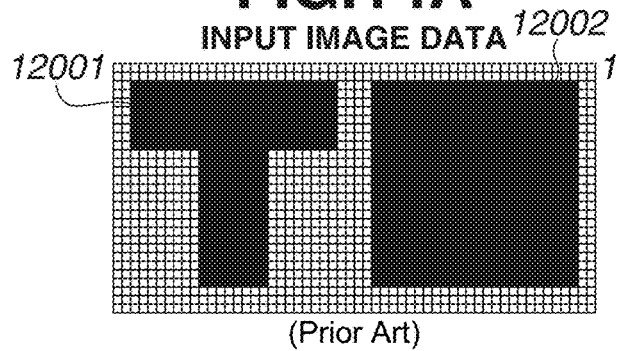
FIGS. 14A to 14G are diagrams illustrating data generation processing according to a comparative example.
Figure 14B:
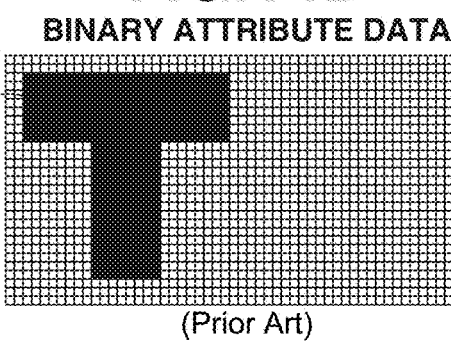
Figure 14D:
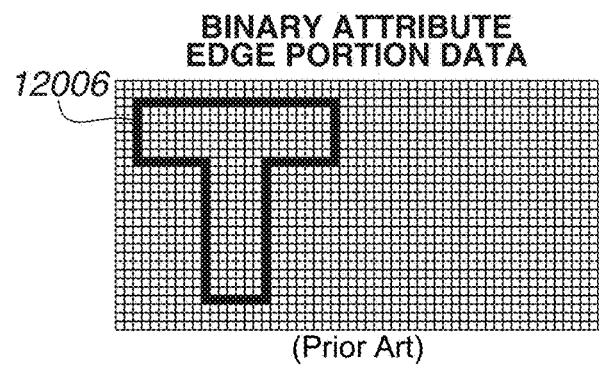
Figure 14C:
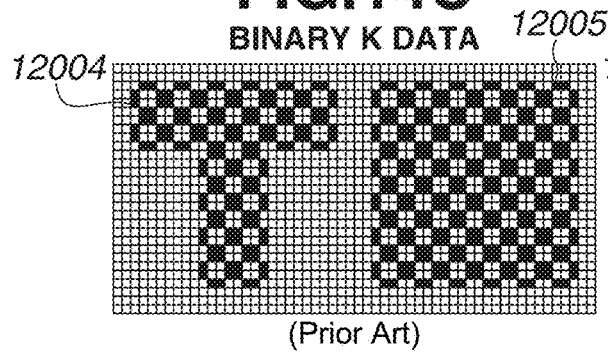
Figure 14E:
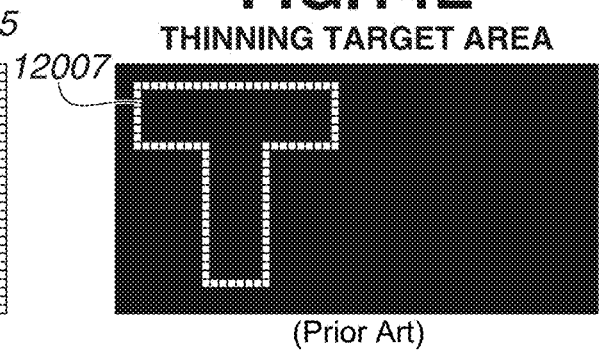
Figure 14F:
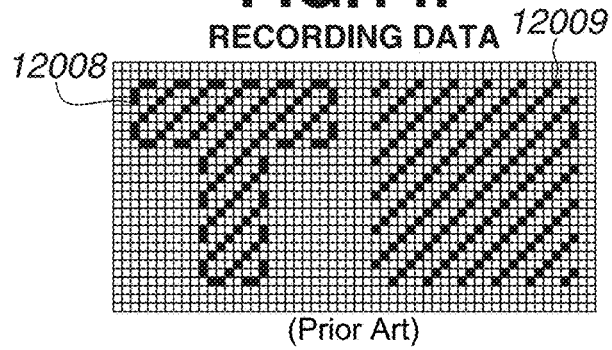
Figure 14G:
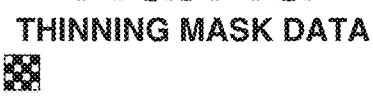

FIGS. 14A to 14G illustrate a comparative example to which a conventional technique is applied. In the comparative example, the recording duty of the edge portion of a black character portion 12008 in recording data illustrated in FIG. 14F is 50%, and the recording duty of the other area is limited to 25% or less by thinning using thinning mask data with a recording ratio of 50% illustrated in FIG. 14G. Input image data in FIG. 14A and binary attribute data in FIG. 14B are the same as those according to the present exemplary embodiment.

FIG. 14C illustrates binary K data according to the comparative example. Image processing parameters corresponding to the recording duty (50%) of the edge portion of the black character portion 12008 are set in color conversion processing and quantization processing, whereby the binary K data with a recording duty of 50% is generated.

FIG. 14E illustrates a thinning target area 12007. The recording area excluding the one-pixel-wide outline of character attribute edge portion data 12006 illustrated in FIG. 14D is set as the thinning target area 12007. In the thinning target area 12007 illustrated in FIG. 14E, the binary K data of FIG. 14C and the 50%-duty thinning mask data illustrated in FIG. 14O are ANDed to generate the recording data of FIG. 14F. At this time, the thinning mask data is used repeatedly in the X direction (the scanning direction) and the Y direction (the conveyance direction).

The edge portion of the black character portion 12008 in the generated recording data in FIG. 14F has a recording duty of 50%, whereby the black character can be output with a sharp outline. On the other hand, the non-edge portion of the black character portion 12008 and a solid portion 12009 have a recording duty of 25%, but the data arrangement generated in the quantization processing is disturbed by the thinning processing using the thinning mask data. FIG. 14F illustrates a state where a diagonal texture artifact appears. While a texture artifact occurs in the comparative example, other various effects can occur depending on the quantization processing parameters and the thinning mask data, resulting in lower image quality of recording products.

As described above, the edge correction processing according to the present exemplary embodiment can maintain the quantized data by adding recording data to the detected edge portion. The quality of characters and thin lines can thus be improved without causing an image defect such as a texture artifact even in a case where plain paper with a low ink absorption property and low fixability is used.

The additional mask data may be changed depending on the setting conditions. The additional mask data may be changed based on the type of the recording medium P as a setting condition. For example, inkjet plain paper has a high ink absorption property and thus the recording duty of the solid portion can be set to 50%. Accordingly, parameters corresponding to the maximum recording duty of 50% are set as the image processing parameters for the color conversion processing 1007 and the quantization processing 1009 to generate 50%-duty binary data. Since black characters with sharp outlines can be reproduced directly from the quantized binary data, the additional mask data may be set to correspond to a recording duty of 0%.

TABLE 1

| Recording medium | Quality | Number of passes | Max recording duty | Additional mask duty | Edge portion recording duty | Addition amount |
|---|---|---|---|---|---|---|
| Plain paper | Fast | 1 | 25% | 50% | 62.5% | 37.5% |
| | Standard | 2 | 40% | 40% | 64.0% | 24.0% |
| Inkjet plain paper | Fast | 1 | 50% | 0% | 50.0% | 0.0% |
| | Standard | 2 | 70% | 0% | 70.0% | 0.0% |
| Coated paper | Fast | 2 | 80% | 100% | 100.0% | 20.0% |
| | Standard | 4 | 100% | 0% | 100.0% | 0.0% |
| Glossy paper | Fast | 4 | 100% | 0% | 100.0% | 0.0% |
| | Standard | 8 | 100% | 0% | 100.0% | 0.0% |

Table 1 illustrates the image processing parameters for recording conditions used in the present exemplary embodiment. The types of the recording medium P include plain paper, inkjet plain paper, coated paper, and glossy paper. The recording quality can be selected between two options: "standard" and "fast". The number of passes indicates the number of times the recording head 105 scans the unit area on the recording medium P. In general, the greater the number of passes is, the more the amount of ink that can be applied is, i.e., the higher the maximum recording duty is.

For example, in a mode where "plain paper" and "fast" are selected, the quantized data is generated so as to achieve a maximum recording duty of 25% in the color conversion processing 1007 and the quantization processing 1009. The maximum recording duty is limited to 25% since plain paper does not have a receiving layer and has a low ink absorption property. For the edge portion, the 50%-duty additional mask data is used. The quantized data and the additional data are ORed to generate the recording data in which the recording duty of the edge portion is 62.5%. More specifically, 37.5%-duty data is added to the edge portion while the recording duty of the quantized data is 25%.

In a mode where "glossy paper" and "fast" are selected, the quantized data is generated so as to achieve a maximum recording duty of 100% in the color conversion processing 1007 and the quantization processing 1009. The recording duty of the additional mask data for the edge portion is 0%. The recording medium P having a receiving layer like glossy paper has a high ink absorption property. Since the quantized data after the quantization processing 1009 already has a high duty and can produce high quality characters and line drawings, no additional data is used and the processing using additional data is not performed.

In such a manner, based on the combination of the type of the recording medium P and the recording quality, the image processing parameters, such as the color conversion table and the dither pattern used for the image processing, are selected and the recording duty of the additional data to be added to the edge area is determined. In the case of the recording medium P like plain paper for which the image processing parameters that set the maximum recording duty to be relatively low are selected, the additional data is generated and added to the edge portion to suppress deterioration in the quality of characters and line drawings. In a case where the maximum recording duty differs depending on the recording quality as in the case of plain paper, the recording ratio of the additional data can be set to be higher in a mode where the maximum recording duty is lower.

As described above, according to the present exemplary embodiment, the quality of characters and line drawings can be maintained by adding the data indicating recording to the edge portion even in a mode where the maximum recording ratio per unit area is limited to be low. Moreover, the occurrence of a texture artifact in the area other than the edge portion can be suppressed.

In the foregoing first exemplary embodiment, the binary data after the quantization processing 1009 and the additional data are uncorrelated, and thus the recording duty of the edge portion to which the data is added cannot be controlled accurately. In a second exemplary embodiment, a method for accurately controlling the recording duty of the edge portion to which the data is to be added will be described. Data generation processing is similar to that according to the first exemplary embodiment, whereas the recording duty is accurately controlled by making the additional mask data correspond to the dither pattern used in the quantization processing 1009.

The data generation processing according to the present exemplary embodiment will be described with reference to FIGS. 10 and 11A to 11F. Similarly to the first exemplary embodiment, an example where the maximum recording duty of an image is limited to 25% or less using the image processing parameters will be described. Input image data in FIG. 11A, binary attribute data in FIG. 11B, binary K data in FIG. 11C, and binary attribute edge portion data in FIG. 11D are similar to those according to the first exemplary embodiment, and a description thereof will thus be omitted.

Figure 10:
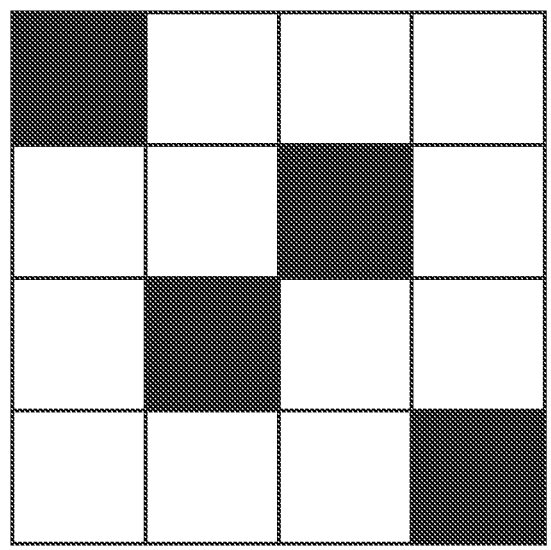
FIG. 10 is a diagram illustrating additional mask data according to a second exemplary embodiment.
Figure 11A:
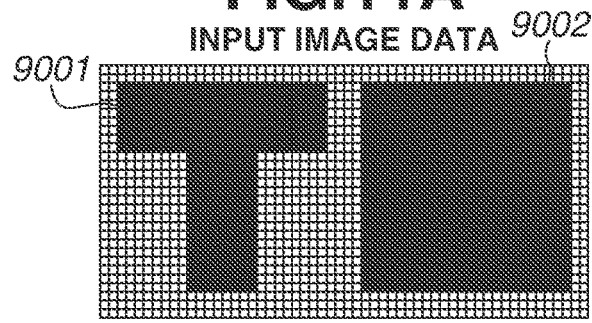
FIGS. 11A to 11F are diagrams illustrating data generation processing according to the second exemplary embodiment.
Figure 11B:
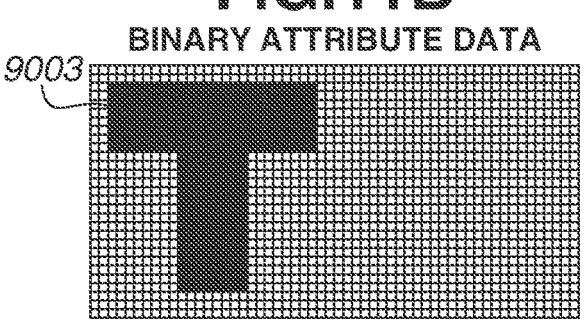
Figure 11D:
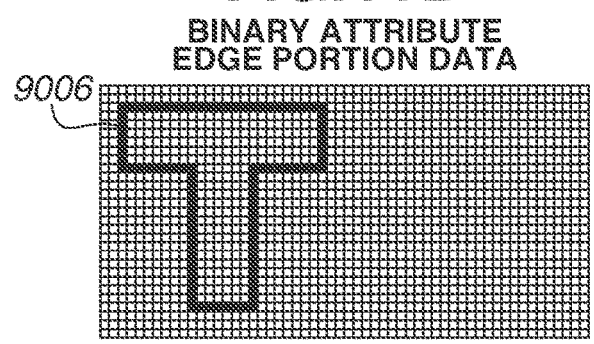
Figure 11C:
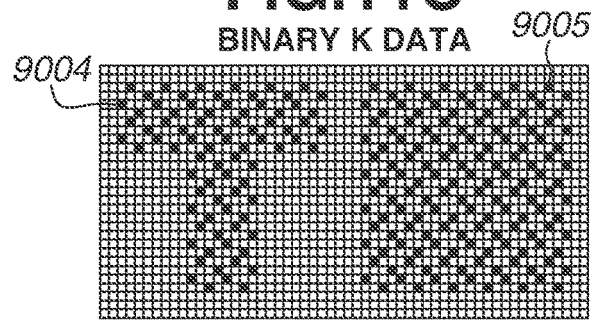
Figure 11E:
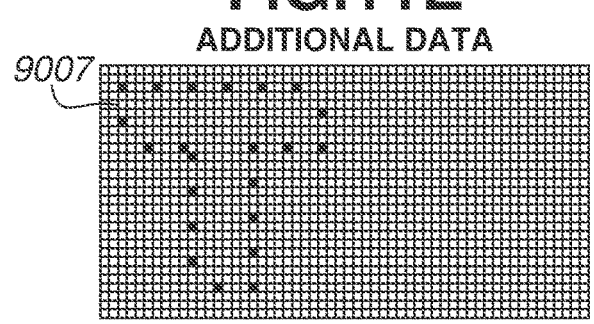

FIG. 10 illustrates additional mask data used in the present exemplary embodiment. The additional recording ratio is set to 25%. In the additional mask data, black pixels corresponding to additional data 9007 illustrated in FIG. 11E are set to correspond to the dither pattern used in the quantization processing 1009 of FIG. 5. More specifically, four pixels corresponding to 25% of the 16 pixels are set as the black pixels in order of positions corresponding to pixels having higher thresholds in the dither pattern. More specifically, the pixels corresponding to the thresholds of 255, 239, 223, and 207 in the high gradation areas of the dither pattern corresponding to the recording duties of 100% to 75% are set as the black pixels of the additional data 9007.

Figure 11F:
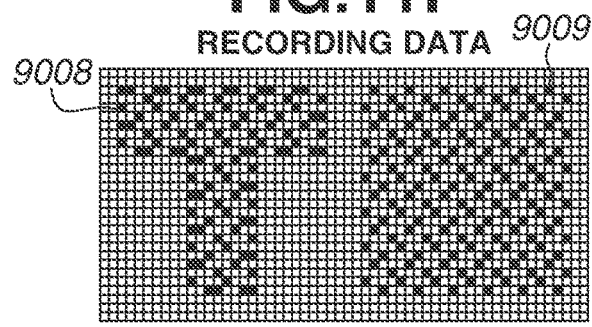

Thus, the additional data 9007 in FIG. 11E is not set at positions overlapping the black pixel positions of the binary K data unless the recording duty of the quantized binary data is 75% or higher. More specifically, recording data illustrated in FIG. 11F is generated by ORing the binary K data of FIG. 11C and the additional data 9007 of FIG. 11E, but the black pixel positions in a black character portion 9004 of the binary K data do not overlap those in the additional data 9007. The recording duty of the edge portion of a black character portion 9008 of the recording data can thus be accurately controlled to 50%.

As described above, in the present exemplary embodiment, the pattern layout of the additional mask data is set to correspond to the pixel positions where the thresholds in the dither pattern used in the quantization processing 1009 are high. This makes it possible to accurately control the recording duty of the edge portion to improve the quality of characters and thin lines.

In the foregoing exemplary embodiments, data indicating whether an object is a character object or a line drawing object is used as the attribute data. In a third exemplary embodiment, a pure black attribute indicating whether a pixel is a pure black pixel is used as the attribute data, and such objects are treated as pure black pixel objects.

Figure 12:
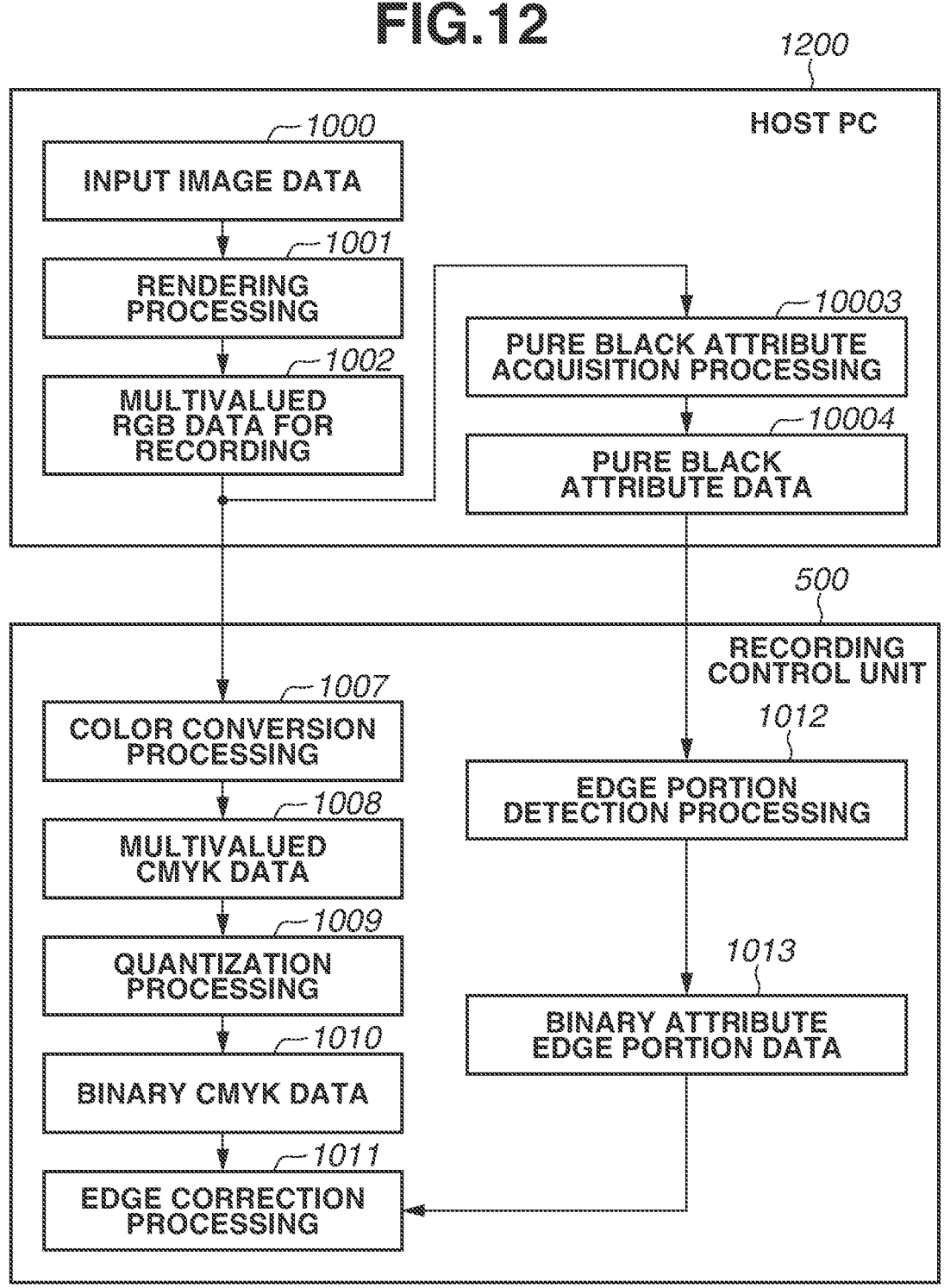
FIG. 12 is a functional block diagram schematically illustrating an image data processing configuration according to the second exemplary embodiment.

FIG. 12 is a block diagram illustrating an image data processing configuration according to the present exemplary embodiment. In the present exemplary embodiment, pure black attribute acquisition processing 10003 is performed on the multivalued RGB data for recording 1002 obtained in the rendering processing 1001. More specifically, pixels having RGB values of (R, G, B)=(0, 0, 0) are determined to have a pure black attribute, and pixels having the other RGB values are determined to not have a pure black attribute. Binary pure black attribute data 10004 is generated by such determination processing. The subsequent processing is similar to that according to the first exemplary embodiment except that the binary attribute data for the edge portion detection processing 1012 is replaced with the pure black attribute data 10004.

Figure 13A:
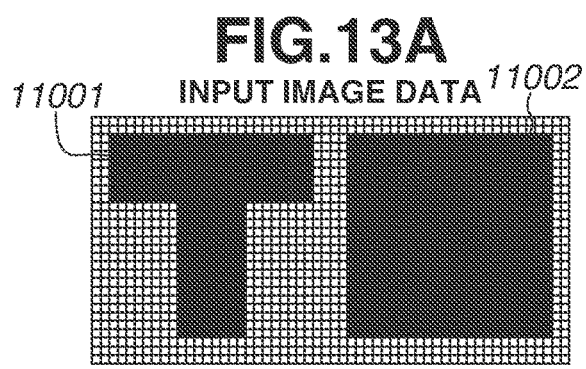
FIGS. 13A to 13F are diagrams illustrating data generation processing according to a third exemplary embodiment.
Figure 13B:
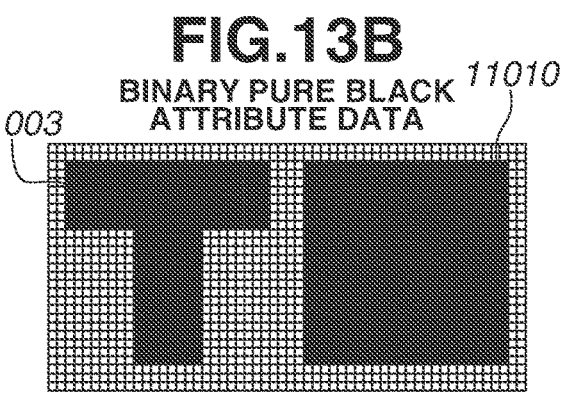

FIGS. 13A to 13F illustrate data generation processing according to the present exemplary embodiment. Since the binary attribute data according to the first exemplary embodiment is replaced with the pure black attribute data 10004 as illustrated in FIG. 13B, a solid portion 11010 is set in addition to a character portion 11003.

Figure 13D:
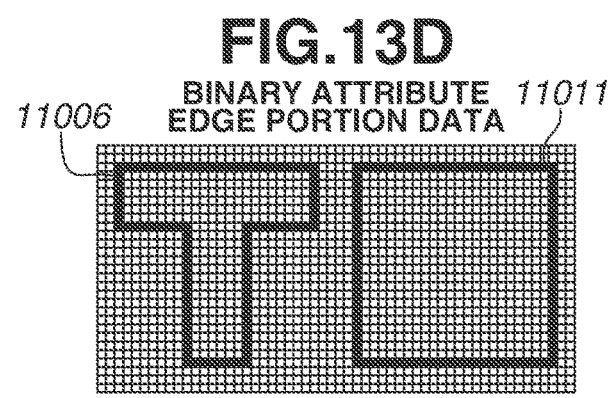

FIG. 13D illustrates attribute edge portion data detected in the edge portion detection processing 1012, which similarly includes a solid portion 11011 in addition to a black character portion 11006. FIG. 13E illustrates generated additional data that similarly includes a black character portion 11007 and a solid portion 11012.

Figure 13C:
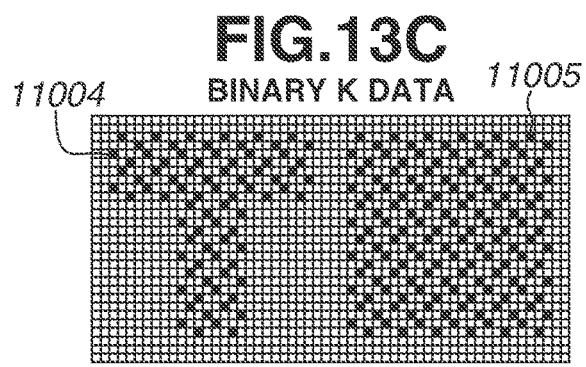
Figure 13E:
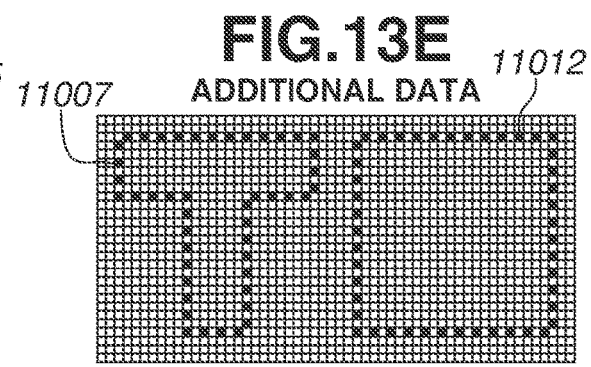
Figure 13F:
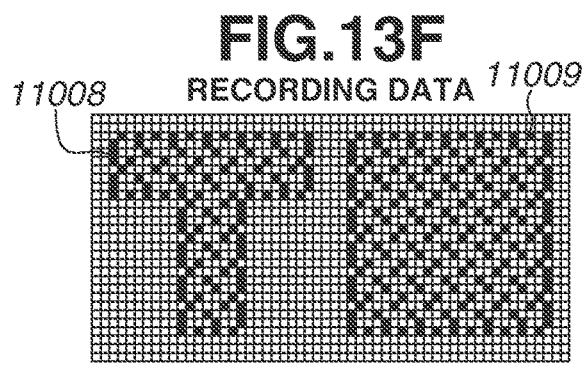

Recording data illustrated in FIG. 13F is generated by ORing the binary K data of FIG. 13C and the additional data of FIG. 13E. As a result, with the additional data, the recording duty of the edge portions of not only a black character portion 11008 but also a solid portion 11009 is set to 50% or higher.

As described above, according to the present exemplary embodiment, black characters and solid images with sharp outlines can be output by using, as the attribute data, information about the pure black attribute indicating whether a pixel is a pure black.

The foregoing exemplary embodiments have dealt with the examples whether the character and line object data or the pure black attribute is applied as the attribute data. However, this is not restrictive. For example, the OR or AND of the character and line object data and the pure black attribute can be set as the attribute data to control the area where recording data is added to the edge portion.

While the examples of application to black (K) data have been described, this is not restrictive and the foregoing exemplary embodiments can be applied to CMY color data. Since the number of passes and the time to complete printing depend on not only the type of the recording medium P but also the recording quality as the setting conditions, the limitation on the recording duty of the solid portion and/or the setting of the additional mask data may be changed.

The recording apparatus 600 is not limited to an inkjet recording apparatus. While the examples of using ink as the recording material have been described, the exemplary embodiments can be applied to any recording apparatus that controls the maximum application amount of the recording material based on the type of recording medium P.

The above-described exemplary embodiments can be implemented by supplying a program for implementing one or more functions according to the exemplary embodiments to a system or an apparatus via a network or a storage medium, and causing one or more processors in a computer of the system or the apparatus to read and execute the program. The above-described exemplary embodiments can also be implemented by using a circuit (e.g., an application specific integrated circuit (ASIC)) for implementing one or more functions according to the exemplary embodiments.

The exemplary embodiments of the present disclosure can provide an image processing apparatus capable of improving the quality of objects, such as characters and line drawings, without deterioration in image quality.

OTHER EMBODIMENTS

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-014555, which was filed Feb. 1, 2021 and which is hereby incorporated by reference herein in its entirety.

What is claimed is:

1. An image processing apparatus comprising:
one or more memories; and
one or more processors,
wherein the one or more memories and the one or more processors are configured to:
acquire N-valued image data corresponding to an image including at least one object, and edge data indicating an edge area of the at least one object;
generate M-valued (N>M≥2) quantized data where each of a plurality of pixels is associated with one of a value indicating that no dot is to be recorded and a value indicating that a dot is to be recorded, based on the N-valued image data, using an image processing parameter; and
change at least one pixel, in the quantized data, among pixels that indicate the edge area of the at least one object in the edge data and have the value indicating that no dot is to be recorded in the quantized data so that the at least one pixel has the value indicating that the dot is to be recorded,
wherein a number of the at least one pixel, in the quantized data, of which the value is changed, is greater in a case where the image processing parameter is a first parameter than in a case where the image processing parameter is a second parameter.

2. The image processing apparatus according to claim 1, wherein the one or more memories and the one or more processors are further configured to:
acquire recording condition information including at least one of type information indicating a type of a recording medium on which the image data is to be recorded or quality information indicating recording quality in recording the image data, and
generate the quantized data by using a selection of the first parameter or the second parameter as the image processing parameter that is based on the recording condition information.

3. The image processing apparatus according to claim 2, wherein the one or more memories and the one or more processors are further configured to change the value of the at least one pixel, in the quantized data, based on additional data generated by thinning out pixels corresponding to the edge area.

4. The image processing apparatus according to claim 3, wherein the additional data is generated by thinning out the pixels corresponding to the edge area at a thinning ratio based on the recording condition information.

5. The image processing apparatus according to claim 3, wherein the one or more memories and the one or more processors are further configured to change the value of the at least one pixel, in the quantized data, by ORing the additional data and the quantized data.

6. The image processing apparatus according to claim 3, wherein as a maximum recording ratio per unit area of the quantized data generated by using the image processing parameter is higher, a recording ratio indicated by the additional data is lower.

7. The image processing apparatus according to claim 2,
wherein a maximum recording ratio per unit area of the quantized data generated by using the first parameter as the image processing parameter is a first recording duty, and
wherein a maximum recording ratio per unit area of the quantized data generated by using the second parameter as the image processing parameter is a second recording duty higher than the first recording duty.

8. The image processing apparatus according to claim 2,
wherein in a case where the type information indicates a first type of the recording medium, the first parameter is selected as the image processing parameter, and
wherein in a case where the type information indicates a second type of the recording medium, a-the second parameter is selected as the image processing parameter.

9. The image processing apparatus according to claim 8, wherein the first type of the recording medium is a recording medium including no receiving layer, and the second type of the recording medium is a recording medium including a receiving layer.

10. The image processing apparatus according to claim 8, wherein the first type of the recording medium is plain paper, and the second type of the recording medium is coated paper or glossy paper.

11. The image processing apparatus according to claim 2,
wherein in a case where the type information indicates a first type of the recording medium and the quality information indicates first quality, the first parameter is selected as the image processing parameter, and
wherein in a case where the type information indicates the first type of the recording medium and the quality information indicates second quality, the second parameter is selected as the image processing parameter.

12. The image processing apparatus according to claim 8, wherein a maximum recording ratio per unit area of the quantized data generated by using the first parameter is lower than a maximum recording ratio per unit area of the quantized data generated by using the second parameter.

13. The image processing apparatus according to claim 1, wherein the one or more memories and the one or more processors are further configured to not change a value of a pixel, in the quantized data, that does not correspond to the edge area of the at least one object.

14. The image processing apparatus according to claim 1, wherein the one or more memories and the one or more processors are further configured to generate the edge data by detecting the edge area based on attribute data indicating whether each pixel in the image is a pixel of a predetermined kind of object.

15. The image processing apparatus according to claim 14, wherein the attribute data is data indicating whether each pixel in the image is a pixel of a character or a pixel of a line drawing.

16. The image processing apparatus according to claim 14, wherein the one or more memories and the one or more processors are further configured to acquire the attribute data from an external supply apparatus.

17. The image processing apparatus according to claim 1, wherein the one or more memories and the one or more processors are further configured to generate the edge data by detecting the edge area by determining whether each pixel in the N-valued image data is a pixel expressing a predetermined color.

18. The image processing apparatus according to claim 17,
wherein the N-valued image data is red-green-blue (RGB) data, and
wherein the one or more memories and the one or more processors are further configured to determine a pixel of (R, G, B)=(0, 0, 0) in the N-valued image data as a pixel of the at least one object, and detect the edge area of the at least one object.

19. The image processing apparatus according to claim 1, further comprising a recording head configured to record the dot on a recording medium.

20. An image processing method comprising:
acquiring N-valued image data corresponding to an image including at least one object, and edge data indicating an edge area of the at least one object, wherein all of the edge area resides within the at least one object and constitutes a portion of the at least one object;
generating M-valued (N>M≥2) quantized data that includes a plurality of pixels that correspond to the at least one object, which include pixels that correspond to the edge area of the at least one object, where each of the plurality of pixels is associated with one of a value indicating that no dot is to be recorded and a value indicating that a dot is to be recorded, by quantizing the N-valued image data, wherein the pixels that correspond to the edge area of the at least one object include pixels that have the value indicating that a dot is to be recorded interspersed with pixels that have the value indicating that no dot is to be recorded; and
changing at least one pixel among the pixels that correspond to the edge area of the at least one object, as indicated by the edge data, and that have the value indicating that no dot is to be recorded in the quantized data so that the at least one pixel has the value indicating that the dot is to be recorded.

21. A non-transitory computer-readable storage medium storing a program for causing a computer to perform an image processing method comprising:
acquiring N-valued image data corresponding to an image including at least one object, and edge data indicating an edge area of the at least one object, wherein all of the edge area resides within the at least one object and constitutes a portion of the at least one object;
generating M-valued (N>M≥2) quantized data that includes a plurality of pixels that correspond to the at least one object, which include pixels that correspond to the edge area of the at least one object, where each of the plurality of pixels is associated with one of a value indicating that no dot is to be recorded and a value indicating that a dot is to be recorded, by quantizing the N-valued image data, wherein the pixels that correspond to the edge area of the at least one object include pixels that have the value indicating that a dot is to be recorded interspersed with pixels that have the value indicating that no dot is to be recorded; and
changing at least one pixel among the pixels that correspond to the edge area of the at least one object, as indicated by the edge data, and that have the value indicating that no dot is to be recorded in the quantized data so that the at least one pixel has the value indicating that the dot is to be recorded.

* * * * *